May 30, 1939.  H. KARTHAUS  2,160,312

APPARATUS FOR VULCANIZING RUBBER ARTICLES

Filed April 16, 1936

Inventor
HANS KARTHAUS
By C. P. Goepel.
Attorney

Patented May 30, 1939

2,160,312

UNITED STATES PATENT OFFICE 2,160,312

APPARATUS FOR VULCANIZING RUBBER ARTICLES

Hans Karthaus, Hanover, Germany, assignor to Continental Gummi-Werke Aktiengesellschaft, Hanover, Germany Application April 16, 1936, Serial No. 74,616
In Germany August 31, 1935

3 Claims. (Cl. 18—6)

This invention relates to processes for vulcanizing of rubber articles, and more particularly to an improved means and method whereby a continuous movement of the molds with the articles therein may be had and at the same time the articles may be properly vulcanized.

Hollow objects made of rubber have hitherto been heated in various ways; for example, articles have been placed in iron molds which are screwed or wedged together, and the vulcanizing performed in heating boilers. Another method is that of pressing the molds together in which the articles are heated by means of a hydraulic press built into the heating boiler, in consequence whereof the time-consuming wedging or screwing is dispensed with. Furthermore the vulcanizing has also been effected in so-called heatable presses, which combine in one piece the mold, the press, and the heating.

These processes have the drawback that a comparatively high consumption of steam is necessitated by the fact that the molds which are employed must, in conformity with the steam pressures and hydraulic pressures which are used, be built so as to be specially strong and, therefore, require a large quantity of steam to heat them. Furthermore, by the processes hitherto known a flowing course of operation and an excellent utilization of the apparatus can be achieved either imperfectly or not at all.

The present invention abolishes these drawbacks by means of a process for the vulcanizing of rubber articles which are to be heated in molds, particularly hollow objects made of rubber, spongy rubber and moss rubber articles, tires, hose, and the like, in which the vulcanizing is performed in hot air of atmospheric pressure in a heating oven which renders possible a continuous charging and emptying of the heating molds. The heating molds are conveyed on a conveyor chain or a similar conveyor contrivance, first through a heating zone and immediately thereafter through a cooling zone. The cooling of the molds and the vulcanized rubber articles is effected by means of air. The heat which is stored in the heated molds and rubber articles is utilized through circulation of air for the preheating of the newly introduced cold molds, and in this manner the heat from the hot molds is transferred to the cold molds. The movement of the molds through the oven is effected automatically by means of a time clock so that the conveyor carrying the molds is moved forward to the extent of one division. The conveyor controlling clock may be changed at will so that various types of molds may be passed through the same oven. A number of molds of the same external dimensions may be locked together in a suitable frame to form a bundle of molds, the locking means for the molds being of a well known type.

Hitherto a continuous movement of the molds was impossible by reason of the fact that the molds used had so great a mass that a heating thereof to the temperature of vulcanization by means of hot air could not be attained. By the present invention, however, it is possible to have a continuous movement of the molds, and the molds themselves weigh only a fraction of the molds used formerly. The light weight of the molds used in the present invention also permits the hanging of the molds on a conveyor chain or the like which passes through a hot air shaft. The very light weight of the molds permits the rapid exchange of heat from the heated air so that a continuous movement of the molds is made possible.

With the foregoing and other objects in view, the invention will be more fully described hereinafter, and will be more particularly pointed out in the claims appended hereto.

In the drawing, wherein like symbols refer to like or corresponding parts throughout the several views.

Figure 1:
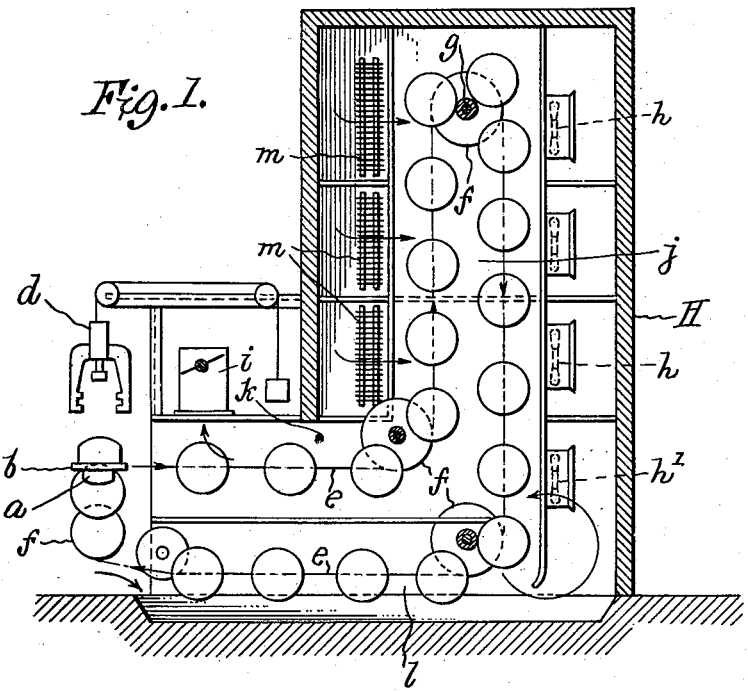
Figure 1 is a diagrammatic view, partly in vertical section, of a vulcanizing means embodying the process for continuous movement in accordance with the present invention.
Figure 2:
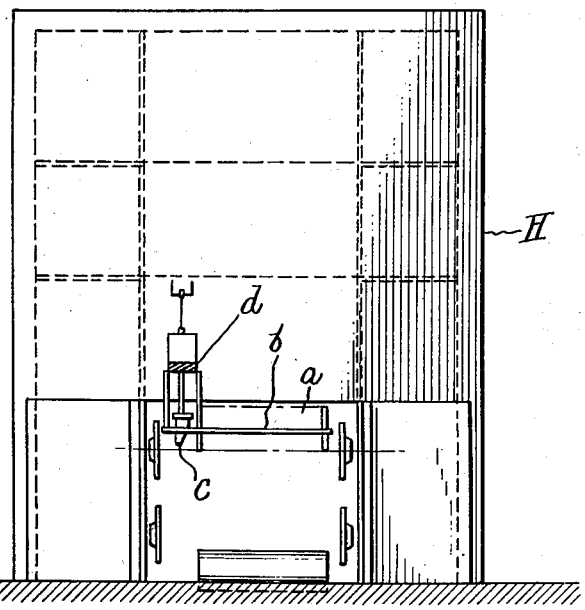
Figure 2 is a front elevation of the device.

Referring to the drawing, the letter $a$ designates a mold which is held together in a tensioned frame $b$ by means of a wedge $c$, and the wedge $c$ is pressed into the frame of the mold $a$ by means of a hydraulically operated member $d$. The frames $b$ are attached to two endless conveyor chains or belts $e$, and these chains $e$ are trained over sprocket wheels or idlers $f$. A drive shaft $g$ is connected to one of the sprocket wheels $f$, and this drive shaft $g$ is connected to a suitable electric motor, or other power means (not shown), the operation of which is timed by means of a time clock $i$.

The chain $e$ initially enters a housing or oven H and travels horizontally through a preheating chamber $k$, and then rises vertically into the vulcanizing chamber $j$. At one side of the vulcanizing chamber $j$ there are disposed a series of heat exchanging members $m$ in the form of radiators or other suitable means for producing the desired degree of hot air in the chamber $j$. On the other side of the chamber *j* there are positioned suction fans *h* which draw the hot air horizontally through the chamber *j*. The hot air drawn out of the chamber *j* by the suction fans *h* may be conducted by suitable ducts or the like to the lower portion of the housing H where a fan *h'* blows the air past the downwardly moving molds and in a horizontal direction opposed to the movement of the molds in the chamber *k*. In this manner the heat contained in the downwardly moving molds, that is, the molds leaving the vulcanizing chamber *j* will be dissipated to a marked degree, and the heat from these molds will be used to preheat the incoming molds which are entering the preheating chamber *k*.

The timing means *i* may be so adjusted that the molds remain within the vulcanizing chamber *j* for a sufficient length of time in which to properly vulcanize the articles contained within the molds. When the molds leave the vulcanizing chamber *j* they enter a cooling chamber *l*, which in the present instance is disposed below the preheating chamber *k*. Part of the air blown through the preheating chamber *k* may be drawn horizontally through the cooling chamber *l*, and this air will, of course, be gradually heated through contact with the hot molds so that the air blown horizontally through the preheating chamber *k* will be of a temperature sufficient to initially heat the molds and the articles disposed therein.

It will be apparent from the foregoing that a process and means has been disclosed whereby a continuous movement may be effected of the molds containing the articles to be vulcanized, and when the molds are discharged from the oven they will be cooled to a sufficient degree to permit handling thereof and recharging.

What is claimed is:

1. In an apparatus for vulcanizing articles contained in lightweight molds permitting rapid exchange of heat, an L-shaped housing, said housing having an opening to the atmosphere for the intake and discharge of said molds and having a plurality of intercommunicating chambers successively arranged in the order of the direction of movement of the molds, said chambers comprising a preheating chamber, a vulcanization chamber, and a cooling chamber, the preheating and the cooling chambers both extending from the opening of the housing, the vulcanization chamber being in the upright of the L-shaped housing and between the preheating and cooling chambers, conveying means for moving the molds successively in said direction of movement through the preheating, vulcanization and cooling chambers, means at one side of the upright of the L for supplying vulcanizing heat to the vulcanization chamber, and means at the other side of said upright and at substantially the same horizontal position as the vulcanizing heat means for drawing the vulcanizing heat to its side, across the space formed by said sides and over and across any molds passing through said space, whereby the molds enter at substantially the same location in respect to the housing as they are discharged and are successively subjected to a preheating, vulcanization and cooling by air under atmospheric pressure in the housing.

2. In an apparatus for vulcanizing articles contained in lightweight molds permitting rapid exchange of heat, an L-shaped housing, said housing having an opening to the atmosphere for the intake and discharge of said molds and having a plurality of intercommunicating chambers successively arranged in the order of the direction of movement of the molds, said chambers comprising a preheating chamber, a vulcanization chamber, and a cooling chamber, the preheating and the cooling chambers both extending from the opening of the housing, the vulcanization chamber being in the upright of the L-shaped housing and between the preheating and cooling chambers, conveying means for moving the molds successively in said direction of movement through the preheating, vulcanization and cooling chambers, a series of means at one side of the upright of the L for supplying vulcanizing heat to the vulcanization chamber, and a series of means at the other side of said upright for drawing the vulcanizing heat to its side across the space formed by said sides and over and across the molds passing through said space, whereby the molds enter at substantially the same location in respect to the housing as they are discharged and are successively subjected to a preheating, vulcanization and cooling by air under atmospheric pressure in the housing.

3. In an apparatus for vulcanizing articles contained in lightweight molds permitting rapid exchange of heat, an L-shaped housing, said housing having an opening to the atmosphere for the intake and discharge of said molds and having a plurality of intercommunicating chambers successively arranged in the order of the direction of movement of the molds, said chambers comprising a preheating chamber, a vulcanization chamber, and a cooling chamber, the preheating and the cooling chambers both extending from the opening of the housing, the vulcanization chamber being in the upright of the L-shaped housing and between the preheating and cooling chambers, conveying means for moving the molds successively in said direction of movement through the preheating, vulcanization and cooling chambers, means at one side of the upright of the L for supplying vulcanizing heat to the vulcanization chamber, means at the other side of said upright and at substantially the same horizontal position as the vulcanizing heat means for drawing the vulcanizing heat to its side, across the space formed by said sides and over and across any molds passing through said space, and a fan disposed below such last named means to blow air against the molds moving out of the vulcanization chamber and into the preheating chamber.

HANS KARTHAUS.